April 16, 1963 C. J. SHEEHAN 3,085,548
APPARATUS FOR CONTINUOUS DEPOSITION OF PARTICULATE MATERIAL
Filed May 1, 1959 4 Sheets-Sheet 2

CHARLES J. SHEEHAN INVENTOR.

BY Cornelius H. Cleary

ATTORNEY

April 16, 1963     C. J. SHEEHAN     3,085,548
APPARATUS FOR CONTINUOUS DEPOSITION OF PARTICULATE MATERIAL
Filed May 1, 1959     4 Sheets-Sheet 3

CHARLES J. SHEEHAN    INVENTOR.

BY Cornelius H. Cleary

ATTORNEY

CHARLES J. SHEEHAN INVENTOR.

BY Cornelius H. Cleary

ATTORNEY.

United States Patent Office 3,085,548
Patented Apr. 16, 1963

3,085,548
APPARATUS FOR CONTINUOUS DEPOSITION OF PARTICULATE MATERIAL
Charles J. Sheehan, Springfield, Mass., assignor to Monsanto Chemical Company, St. Louis, Mo., a corporation of Delaware
Filed May 1, 1959, Ser. No. 810,330
2 Claims. (Cl. 118—308)

The present invention relates to deposition of particulate materials onto continuously advancing webs.

Large quantities of polyvinyl butyral are produced for ultimate use as interlayer material in safety glass. In large scale operations, the butyral is processed as a continuous web (film or sheet) prior to being divided into sections of suitable size for fabrication. A characteristic of polyvinyl butyral which lends admirably to its use in safety glass is its tackiness. This facilitates secure interbonding between glass panels. The same characteristic, however, lends difficulty to processing and handling, in that when webs of the butyral are formed into rolls or otherwise packaged in a manner convenient for shipping or handling, unless some precaution is taken the butyral becomes coalesced.

An expedient used to prevent polyvinyl butyral webs from becoming coalesced has been that of depositing dry particulate materials, such as sodium bicarbonate and the like, onto the surface thereof, prior to winding. The particulate materials are preferably water-soluble in nature so that they can be later rinsed off the webs.

Various apparatuses as well as processes have been devised to continuously deposit particulate material onto travelling webs of polyvinyl butyral, and, while they have solved the basic problem of preventing the film from becoming coalesced, they have initiated other problems, principally through failure to deposit the particulate material as a uniform layer. Webs of polyvinyl butyral being of a rather limpid nature will compensate any unevenness in the layers of particulate material, to effect an uneven surface, which is retained and seriously interferes with fabrication into satisfactory safety glass panels.

Accordingly, it is a principal object of the present invention to provide a uniform layer of powdered material onto a continuously travelling or advancing web (sheet or film).

Another object of the invention is to provide apparatus and process expedients by which to accomplish this.

Other objects of the invention will in part be obvious and will in part appear hereinafter.

These and other objects are attained in a powdered material dispensing apparatus positionable vertically of a continuously advancing web, said apparatus comprising a hopper having a bottom discharge orifice, said orifice having a lateral extension the effective width of said web, a rotatable particulate material fluidizing roll having a plurality of radially projecting spicules located within said hopper, the axis of said fluidizing roll extending laterally of said hopper, a rotatable metering roll in parallel relationship to said fluidizing roll having an upper arcuate portion thereof located within said orifice, a rotatable brush roll, the axis of which is parallel to and the periphery of which is in engagement with said metering roll; said brush roll being located externally of said orifice, said brush roll being rotatable in a direction opposite to the direction of rotation of said metering roll, an activated screen interpositioned between said brush roll and said web and means for rotating said rolls and activating said screen.

For a fuller understanding of the nature and objects of the invention, reference should be had to the following detailed description taken in conjunction with the accompanying drawings in which.

Figure 1:
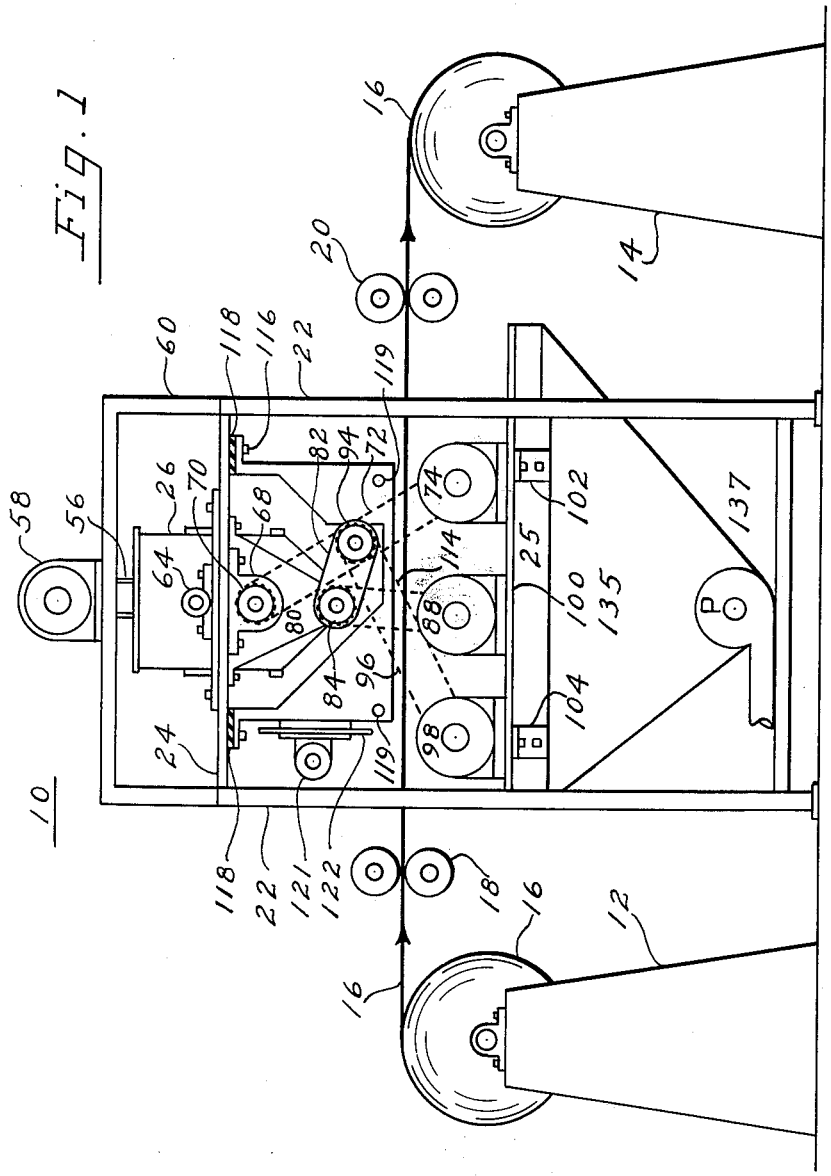
FIG. 1 is a side view partly in section and with various parts broken illustrating one embodiment of the present invention.
Figure 2:
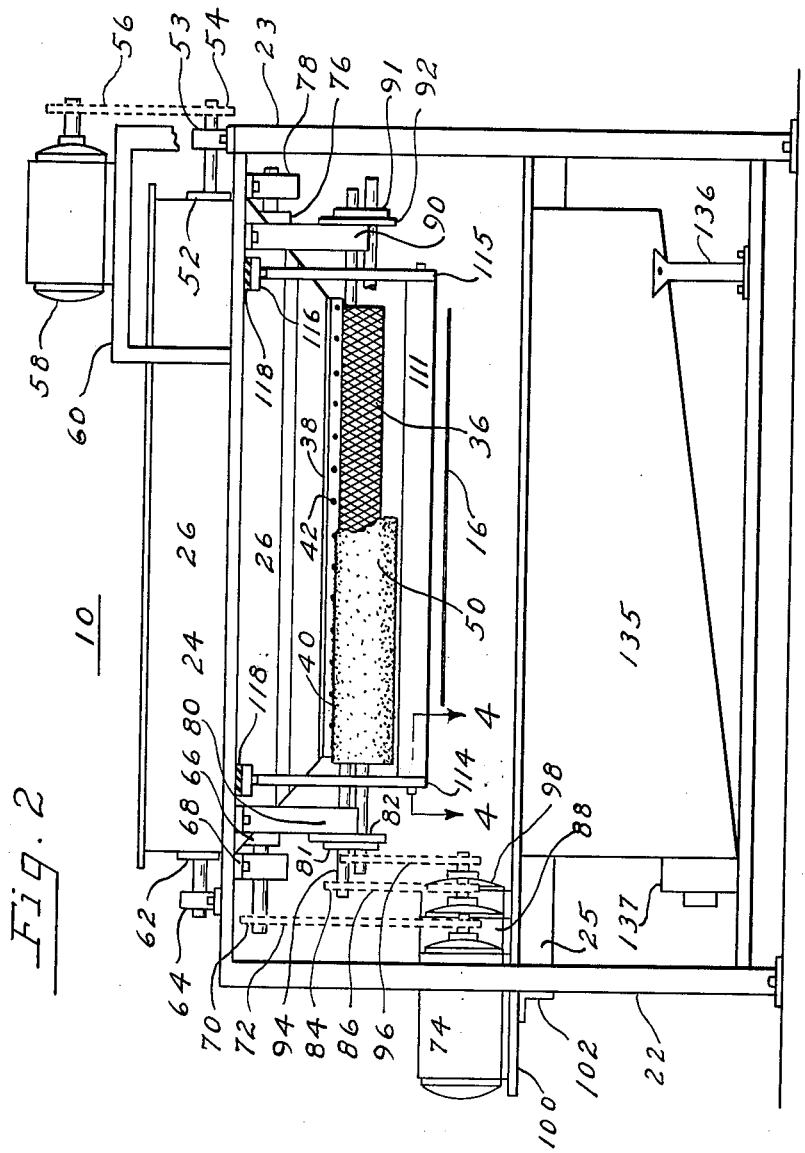
FIG. 2 is a rear view with various parts broken illustrating an embodiment of the present invention corresponding to that shown in FIG. 1.

Referring now to the drawings wherein like numbers refer to like parts throughout, FIGS. 1 and 2 represent a particulate material dispensing apparatus 10 provided with reels 12 and 14, the latter two designed to facilitate continuous advance of web 16. Advance is in the direction of reel 14. A pair of rolls 18 designed to guide web 16 are positioned to the initiation or front end of apparatus 10, while a complementary set of guide rolls 20 are located to the discharge end or rear of apparatus 10. A motor or motors, not shown, provide rotation to reels 12 and 14. A pair of positioning frames 22 and 23 are laterally spaced on either side of web 16 through stretcher frames 24 and 25. Any convenient construction, bolted, welded, etc., can be used in securing the frames together. Frame 24 acts to support hopper 26.

Figure 3:
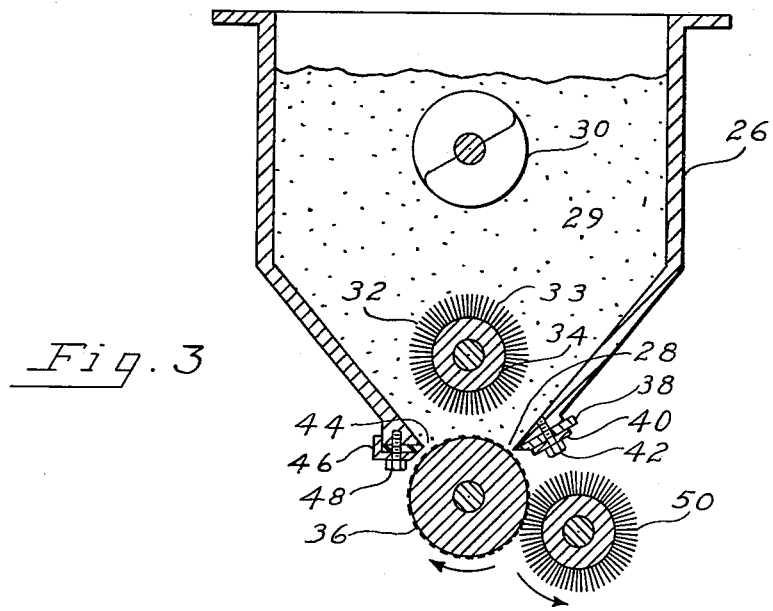
FIG. 3 is an enlarged sectional, fragmentary, side view of one embodiment of a hopper and associated rotatable members (rolls) which can be used in the present invention.
Figure 5:
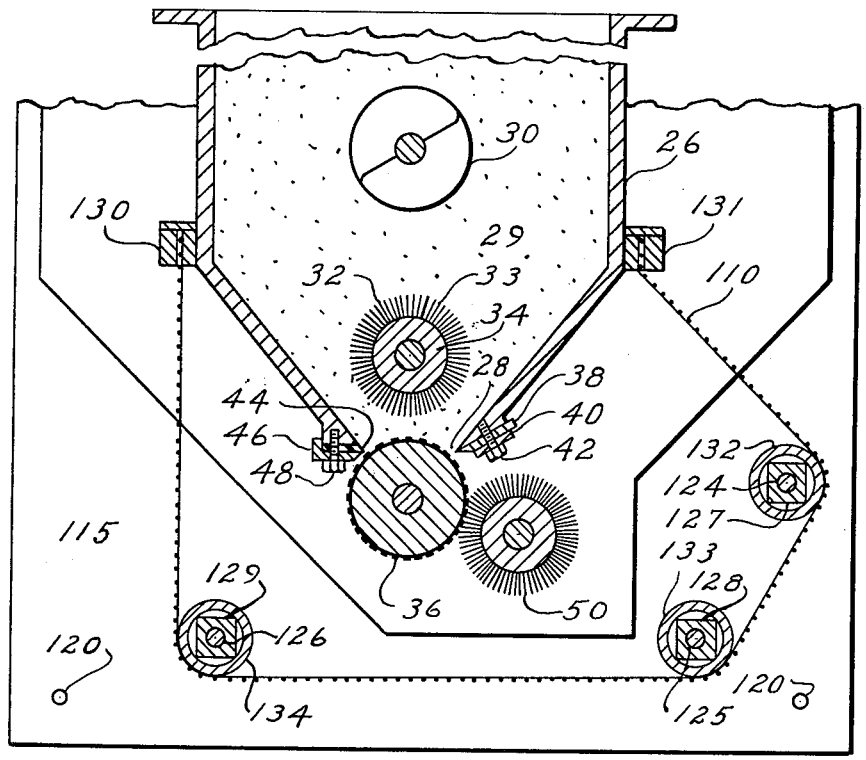
FIG. 5 is an enlarged, sectional fragmentary, side view of a hopper, associated rotatable members and vibratable screen representing another embodiment of the present invention.

FIGS. 3 and 5 illustrate an acceptable side configuration for hopper 26, the bottom of which is truncated to terminate in orifice 28. Orifice 28 laterally extends the effective width of web 16. Hopper 26 is shown containing a quantity of particulate material 29, such as sodium bicarbonate, designed for deposition on the surface of web 16. A rotatable particulate material feed screw 30, which is counter-flighted, extends laterally through the top portion of hopper 26. Fluidizing roll 32 extends laterally through the bottom portion of hopper 26, and has a plurality of radially projecting spicules 33. Particulate material fluidizing roll 32 can be conveniently fitted with spicules 33 by using card clothing wrap 34. The location of fluidizing roll 32 within hopper 26 is such as to provide fluidization to, and uniformly force supply of particulate material 29 immediate to orifice 28. Spaced relationship between fluidizing roll 32 and feed screw 30 should be maintained however. The upper arcuate portion of rotatable metering roll 36 is located within orifice 28, and in effect this portion is juxtapositioned between the ends (front and rear) of said orifice. Metering of particulate material 29 from hopper 26 is attained by providing the face of metering roll 36 with a knurled surface. In a desired embodiment, the knurl is provided over the entire face; see for the moment, FIG. 2.

Referring again to FIGS. 3 and 5, a doctor blade 38 which is designed to coact with metering roll 32 in metering the amount of particulate material 29 to be dispensed is located at the rear or after lateral edge of orifice 28 as to form a leading lip on the same. In the embodiments being considered the lip is formed facing downwardly and toward the initiation end of apparatus 10. Doctor blade 38 is secured in position by plate 40 and cap screw(s) 42—42. Alternatively, doctor blade 38 can be made an integral or permanent part of hopper 26 as to form a lateral lip of orifice 28. Additional variations can be practiced in the angular positioning of doctor blade 38. In practice when sodium bicarbonate is to be deposited on a polyvinyl butyral web, a metering roll can be used having a 10 to 20 pitch diamond-shaped knurl made on a thread miller using a 60° cutting tool. Doctor blade 38 is preferably adjusted in relation to metering roll 36 as to give a tolerance which is preferably finite and approaching zero. The front or opposing lateral edge of orifice 28 is provided with a gasket 44 held in position by plate 46 and cap screw(s) 48. The tolerance between gasket 44 and the lands or crests of knurled metering roll 36 is preferably finite and approaching zero.

Rotatable brush roll 50 is located so that the periphery thereof engages the knurled periphery of metering roll 36. Additionally, it is located rearward of metering roll 36 (considered in relation to the direction of advance or travel of web 16) and externally of hopper 26. Brush roll 50 operates to forcefully remove in a downward direction and eventually onto web 16 that portion of particulate material 29, which remains on metering roll 36 after passage under doctor roll 38. In order that this direction can be varied toward the front or rear under varying circumstances, brush roll 50 is arcuately positionable in relation to metering roll 36. Brush roll 50 is rotatable in the direction opposite from that in which metering roll 36 is rotated. Any convenient bristle length as well as number of bristles per unit area of brush roll surface can be used. A crimped nylon-bristle brush roll, the bristles of which are 0.75 inch long and 0.01 inch in diameter having approximately 5,000 bristles per square inch of brush roll surface performs well.

The various rotatable members, i.e., feed screw 30, fluidizing roll 32, metering roll 36 and brush roll 50 can be provided with any convenient rotating means such as electric motors with which to impart the desired rotation to them. FIGS. 1 and 2 indicate one method for accomplishing this. As shown, the shaft of feed screw 30 projects from gasket 52 located in the side of hopper 26, through pillow block 53 and finally is fitted with sprocket 54. Chain 56 then connects sprocket 54 with the drive shaft of electrical motor 58, the latter supported on ancillary frame member 60. At its opposite end, the central shaft of feed screw 30 projects through gasket 62 located in the opposite side of hopper 26, to be then supported by pillow block 64. Fluidizing roll 32 which is parallel to feed screw 30, has one end of the central shaft projecting through gasket 66, located in a side panel of hopper 26, and then through pillow block 68. Sprocket 70 attached at the projected shaft end, is connected through chain 72 to the drive of electrical motor 74. At its opposing end, the shaft of fluidizing roll 32 projects through seal 76 to be supported by pillow block 78. Metering roll 36 is positioned parallel to fluidizing roll 32. One end of the central shaft of metering roll 36 projects through pillow block 80, and through arcuately positionable plate 82. The end, so projected, is provided with sprocket 84 which is connected by chain 86 to the drive of electrical motor 88. Electrical motor 88 is a variable speed unit in order that the speed of metering roll 36 can be varied as determined by the speed of advance or travel of web 16. The opposite shaft end of metering roll 36 is supported by pillow block 90. To maintain parallel relationships with metering roll 36, one shaft end of brush roll 50 projects through flange bearing 81 fastened to arcuate positionable plate 82 to be fitted with sprocket 94, the latter in turn, connected by means of chain 96 to the drive of electric motor 98, while the opposite shaft end projects through flange bearing 91 fastened to arcuately positionable plate 92.

Electric motors 74, 88 and 98 are stationed on supplementary support member 100 which projects laterally outward from frame 22. Member 100 is supported on cross-stretcher frame 25 by means of bolted and welded angles 102 and 104. Motors 74, 88 and 98 are preferably adjustably bolted to member 100, to allow for adjustment of tension in chains 72, 84 and 96 respectively.

Figure 4:
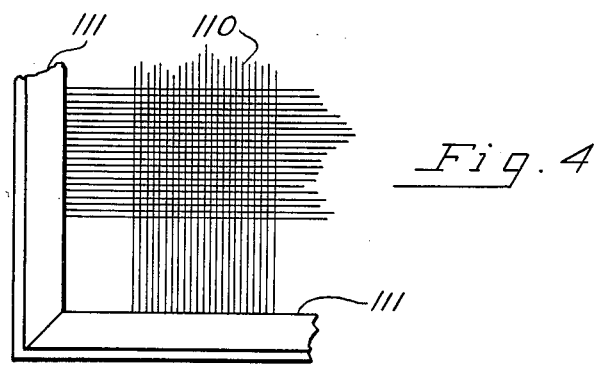
FIG. 4 is an enlarged, fragmentary, top view of one embodiment of a vibratable screen which can be used in the present invention.

An activatable screen 110 supported by screen frame 111 or by screen rotors 124, 125 and 126, as shown respectively in FIGS. 4 and 5 is interpositioned between brush roll 50 and web 16. The mesh size of screen 110 is maintained within limits to allow passage of particulate material 29 while nevertheless effectively containing the windage or turbulence created by the rotation of brush roll 50, which would otherwise cause disruption of particulate material 29, both in the course of being deposited, and after it has become deposited as a layer on web 16. Similarly, the mesh size should be such as not to allow for any appreciable residence of the particulate material 29 on screen 110. With accumulation, particulate material 29 is prone to become agglomerized, which interferes with uniform disposition of the same. The choice of mesh size of screen 110 is also reflected upon by the fact that during operation, screen 110 is vibrated or otherwise activated. In accordance with the preceding, it is suggested that the aperture size of screen 110 be maintained within limits of 400 to 600 microns for screens constituted of filaments, the diameters of which range from 200–400 microns when sodium bicarbonate is the particulate material being deposited.

Screen 110 can have a simple planar configuration as shown in FIG. 4, or can be extended vertically as to enclose metering roll 36 and brush 50 in the manner suggested in FIG. 5. Of the two, the latter is the more preferred embodiment.

FIGS. 1 and 2 illustrate a convenient method by which to position screen 110, when the planar type is used. A pair of side plates 114 and 115 are hung from stretcher frame 24 being secured by bolts 116—116, the latter also serving to integrate shock absorbers 118—118. Screen frame 111, having screen 110 located therein, is then laterally suspended in a horizontal plane between side plates 114 and 115. Bolts 119—119, threaded through holes 120—120, tapped through said side plates, and into complementary holes, not shown, located at either end of frame 111 secure this arrangement. Vibrator 121 which is designed to impart vibration in screen 110 is positioned on vertical plate 122 stretching between side plates 114 and 115. In the simple planar type embodiment, the screen can be formed of filaments made from various materials such as metals, including nickel-steel and other non-corrosive alloys having good tensile strength, in addition to monofilament nylon. The filament and mesh size remain substantially the same with the choice of filament material.

The preferred type of screen 110, which is shown in FIG. 5, requires some adjustment in adapting it for use in the embodiment described above. Initially screen frame 111 and vibrator 121, previously shown, can be eliminated. Rather, each of the side plates 114 and 115 are now provided with a plurality of corresponding holes located in a circumscribed manner in each of the plates. Three holes, not shown, are used in the embodiment on FIG. 5. Through these, the circular shaft ends 124–126 respectively and the opposite ends, not legended, of rotatable eccentric bars 127-129 are projected. Eccentric bars 127-129 are provided with drive mechanisms, including sprockets, chains and motors, or the like, not shown, by which to rotate them. Rotation of these at about 600 r.p.m. works satisfactorily. Eccentric bars 124-126 are illustrated having a square cross-sectional configuration in the effective portions interpositioned between plates 114 and 115, however cross-sectional configurations other than square can be used as can be assessed from their purpose. Screen 110 circumscribes the framework of eccentric bars 127-129 and the ends of screen 110 are secured by clamp-bar 130 located to the front of hopper 26 and clamp-bar 131 located at the rear of hopper 26. In operation, screen 110 is subjected to considerable abrasion by the rotation of eccentric bars 127-129. To eliminate this abrasion to screen 110, sleeves 132-134, of flexible material such as polyvinylchloride or like material, are placed around each of the bars 127-129. Sleeves 132-134 are fixed to the outer race of ball bearings held stationary and positioned to either shaft end of bars 127–

129. This expedient is not shown. Sleeves 132–134 as shown are distinct from bars 127–129 but they can be molded or otherwise integrated to the same with the former expedient being the most desirable. As may be noted, in this embodiment, screen 110 takes a severe configuration, consequently it is suggested that in this embodiment, it be fabricated in total from a strong pliable material such as monofilament nylon.

To improve the economics involved in operating apparatus 10, a collection trough or bin 135 of the type illustrated in FIGS. 1 and 2 can be stationed beneath web 16. This serves to recover a certain amount of the excess of particulate material 29 which fails to deposit on web 16. As shown, bin 135 can be hung from stretcher frame 25. In the present embodiment, bin 135 is provided with a canted bottom, the raised end of which is supported by stanchion 136 and the lower opposite end communicating with centrifugal pump 137, the latter serving to recirculate the collected particulate material 29 through a conduit or other system, not illustrated, to hopper 26.

In operating particulate material dispensing apparatus 10 for the purpose of depositing a uniform layer of particulate material 29 onto continuously advancing web 16 the following procedure can be followed:

Hopper 26 is loaded with particulate material 29, which for present purposes, is sodium bicarbonate, designed for deposit on to a web 16, of polyvinyl butyral, the latter being continuously advanced by the activation of reels 12 and 14. Uniform distribution of particulate material 29 within hopper 26 is facilitated by causing feed screw 30 to be rotated. Fluidizing roll 32 having an outside diameter of about 4 inches is rotated at a speed of about 600 r.p.m. in a clockwise direction considered relative to the figures causing particulate material 29 to become fluidized and simultaneously forced downwardly under uniform pressure against the upper arcuate portion of metering roll 36 located in orifice 28. Rotation of metering roll 36 having a diameter of about 4.5 inches, at a speed varying in accordance with the line speed of web 16, taken conjunctively with the depth of the knurl in the surface thereof, the tolerance between metering roll 36 and doctor knife 38 and the desired thickness of the particulate material layer, in the same direction as that in which fluidizing roll 32 is being rotated, causes particulate material 26 to be continuously collected onto this portion of metering roll 36. Rotation of brush roll 50 having an overall diameter of about 6.0 inches at a speed of about 450 r.p.m. in the direction opposite to that in which metering roll 36 is being rotated, forcefully brushes the particulate material 29 retained on the periphery of metering roll 36, after passing under doctor knife 38, downwardly from the periphery of metering roll 36, through screen 110 which is being activated and onto web 16 as to continuously provide a layer of particulate material, more particularly sodium bicarbonate on said web having a uniform thickness of up to about 0.02 inch.

While the present invention has been illustrated in relation to depositing a particulate material such as sodium bicarbonate onto a plastic material web such as polyvinyl butyral web, it can also be used in other operations in which it is desirable to deposit a uniform layer of particulate material onto a continuously advancing web. Illustrative of other operations in which the subject apparatus can be used, include those in which sand, grit, or abrasive materials are deposited onto webs of paper, cloth, synthetic plastics and the like, with which to form abrasive products. Additionally, the webs referred to can be considered as films, sheets or as units being continuously delivered on link, belt or like continuous conveyor.

It will thus be seen that the objects set forth above, among those made apparent from the preceding description, are efficiently attained and, since certain changes may be made in carrying out the above process and in the construction set forth without departing from the scope of the invention, it is intended that all matter contained in the above description or shown in the accompanying drawings shall be interpreted as illustrative and not in a limiting sense.

What is claimed is:

1. Apparatus adapted to deposit powdered material in a layer of uniform thickness onto a continuously advancing web, said apparatus being vertically positioned in relation to said web and comprising, in combination, a hopper having a bottom discharge orifice, said orifice having a lateral extension the effective width of said web, a rotatable fluidizing roll having a plurality of radially projecting spicules positioned within said hopper for delumping and maintaining constant bulk density of said powdered material, the axis of said fluidizing roll extending laterally of said hopper, a rotatable metering roll positioned externally of said hopper in parallel relationship to said fluidizing roll and having an upper arcuate portion thereof located within said orifice, said metering roll being provided with a knurled surface, a doctor blade in parallel relationship to said metering roll having an edge in contact with the knurled surface of said metering roll for controlling the volumetric discharge of powdered material from said hopper, a rotatable brush roll parallel to and in peripheral engagement with said metering roll, said brush roll being located externally of said hopper and being rotatable in a direction opposite to the direction of rotation of said metering roll for forceably removing the powdered material within the knurls of said metering roll downwardly in a cloud-like fashion, a fine mesh screen for effectively containing the cloud-like turbulence created by the counter-rotations of the brush and metering rolls while permitting a uniform distribution of powdered particles to penetrate, said screen being interposed between said hopper and said web and enclosing the lower portion of said hopper, the metering roll, and the brush roll and provided with activation means for preventing residence of the powdered material within and on the surface of said screen.

2. Apparatus according to claim 1 wherein said screen has an aperture size of from 400–600 microns and is made of monofilament nylon having a diameter of from 200–350 microns.

References Cited in the file of this patent

UNITED STATES PATENTS

| | | |
|---|---|---|
| 465,815 | Claus | Dec. 22, 1891 |
| 533,305 | Lee | Jan. 29, 1895 |
| 1,692,210 | Hofmann | Nov. 20, 1928 |
| 1,870,041 | Dike | Aug. 2, 1932 |
| 1,988,065 | Wooddell | Jan. 15, 1935 |
| 2,013,812 | Supligean et al. | Sept. 10, 1935 |
| 2,027,307 | Schacht | Jan. 7, 1936 |
| 2,057,548 | Wallach et al. | Oct. 13, 1936 |
| 2,163,642 | Wallach | June 27, 1939 |
| 2,185,859 | Massey | Jan. 2, 1940 |
| 2,279,859 | Crawford | Apr. 14, 1942 |
| 2,291,700 | Dreyfus | Aug. 4, 1942 |
| 2,360,650 | Crane | Oct. 17, 1944 |
| 2,395,396 | Conaway | Feb. 26, 1946 |
| 2,613,633 | Dreesen | Oct. 14, 1952 |
| 2,681,637 | Simpson | June 22, 1954 |
| 2,696,445 | Schwartz et al. | Dec. 7, 1954 |